United States Patent [19]

Höhlein et al.

[11] Patent Number: 4,814,410

[45] Date of Patent: Mar. 21, 1989

[54] BINDER CONTAINING ESTER GROUPS AND URETHANE GROUPS, PROCESS FOR PRODUCING AND USE IN THE PRODUCTION OF COATINGS

[75] Inventors: Peter Höhlein; Eberhard Kreiss, both of Krefeld; Josef Pedain; Hans-Joachim Scholl, both of Cologne, all of Fed. Rep. of Germany

[73] Assignee: Bayer Aktiengesellschaft, Bayerwerk, Fed. Rep. of Germany

[21] Appl. No.: 124,222

[22] Filed: Nov. 23, 1987

[30] Foreign Application Priority Data

Dec. 3, 1986 [DE] Fed. Rep. of Germany ....... 3641217

[51] Int. Cl.⁴ .............................................. C08G 18/00
[52] U.S. Cl. .................................................. 528/74.5
[58] Field of Search ........................................ 528/74.5

[56] References Cited

U.S. PATENT DOCUMENTS

| | | | |
|---|---|---|---|
| 3,047,520 | 7/1962 | Fiel ...................... | 528/74.5 |
| 3,177,167 | 4/1965 | Skreckoski et al. ............... | 528/74.5 |
| 3,211,674 | 10/1965 | Sandridge .......................... | 528/74.5 |
| 3,637,540 | 1/1972 | Wolff et al. ........................ | 528/74.5 |

FOREIGN PATENT DOCUMENTS 1495161 2/1969 Fed. Rep. of Germany .
0011922 2/1981 Japan .
0085816 5/1982 Japan .

*Primary Examiner*—John Kight
*Assistant Examiner*—Dennis R. Daley
*Attorney, Agent, or Firm*—Gene Harsh; Joseph C. Gil; Thomas W. Roy

[57] ABSTRACT

The present invention relates to oxidatively drying binders containing ester groups and urethane groups, obtainable by the reaction of (A) about 60 to 98% by weight of esters having an oil length of about 20 to 75% by weight and an OH number of about 20 to 150 selected from
  (i) partial esters of polyhydric alcohols and long-chain unsaturated fatty acids and/or
  (ii) polyesters of polyhydric alcohols, long-chain unsaturated fatty acids and polycarboxylic acids with (B) about 2 to 40% by weight of a polyisocyanate having the following structure

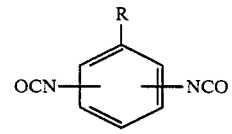

wherein R is a $C_6$–$C_{18}$, preferably a $C_8$–$C_{15}$ and more preferably a $C_{10}$–$C_{13}$ alkyl radical.

4 Claims, No Drawings

BINDER CONTAINING ESTER GROUPS AND URETHANE GROUPS, PROCESS FOR PRODUCING AND USE IN THE PRODUCTION OF COATINGS

BACKGROUND OF THE INVENTION

1. Field of the Invention

This invention relates to oxidatively drying binders obtainable by the reaction of (A) (i) hydroxyl group-containing partial esters of polyhydric alcohols and long-chain unsaturated fatty acids and/or (ii) hydroxy group-containing alkyd resins of polyhydric alcohols, long-chain unsaturated fatty acids and polycarboxylic acids with (B) specific aromatic diisocyanates, to a process for the production of these binders and to their use for the production of coatings. The binders according to the invention are suitable for the production of high-body coating compositions which may be processed to form coatings having high resistance to water.

2. Description of the Prior Art

Oxidatively drying binders containing ester groups and urethane groups include alkyd resins wherein the polycarboxylic acid component has been completely or partly replaced by one or more polyisocyanate components (D. H. Solomon, The Chemistry of Organic Film Formers, John Wiley & Sons, New York 1974, 215). The modification of alkyd resins with polyisocyanates to improve their drying properties is known (Fette und Seifen 52 (1950), 20). In the case of saturated and unsaturated polyesters, this modification with isocyanates has been recommended with a view to obtaining greater hardness and better compatibility (DE-OS No. 19 15 800).

Although modification with isocyanates affords some advantages, it also gives properties which are not entirely satisfactory. These include above all inadequate body and tendencies towards hazing in unpigmented lacquer films and also moderate water resistance of the coatings obtained.

Accordingly, an object of the present invention is to provide oxidatively drying binders containing ester groups and urethane groups which do not have any of the above-mentioned disadvantages.

It has now surprisingly been found that phenylene diisocyanates substituted by long-chain hydrocarbon radicals lead to modified binders which satisfy the stated requirements to a high degree.

SUMMARY OF THE INVENTION

The present invention relates to oxidatively drying binders containing ester groups and urethane groups, obtainable by the reaction of (A) about 60 to 98% by weight of esters having an oil length of about 20 to 75% by weight and an OH number of about 20 to 150 selected from
 (i) partial esters of polyhydric alcohols and long-chain unsaturated fatty acids and/or
 (ii) polyesters of polyhydric alcohols, long-chain unsaturated fatty acids and polycarboxylic acids
with
(B) about 2 to 40% by weight of a polyisocyanate having the following structure

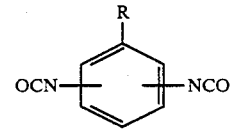

wherein R is $C_6$–$C_{18}$, preferably a $C_8$–$C_{15}$ and more preferably a $C_{10}$–$C_{13}$ alkyl radical.

The present invention is also directed to a process for the preparation of these binders and their use for the production of coatings.

DETAILED DESCRIPTION OF THE INVENTION

The percentages of (A) plus (B) are preferably based in either case on the sum of (A) and (B). The esters preferably have an OH number of 30 to 100.

The partial esters (i) and the polyesters (ii) are known from the production of oxidatively drying urethane alkyd resins and alkyd resins (H. Kittel, Lehrbuch der Lacke und Beschichtungen, Vol. 1, Part 2, pp. 567–571 and D. H. Solomon, The Chemistry of Organic Film Formers, John Wiley & Sons, New York 1974, pp. 214, 215).

Preferred alcohols for the synthesis of the partial esters (i) and the polyesters (ii) are aliphatic, cycloaliphatic and/or araliphatic alcohols containing from 2 to 15, preferably from 3 to 8 carbon atoms and from 2 to 6, preferably 3 to 4 OH groups attached to non-aromatic carbon atoms per molecule. Examples include glycols such as ethylene glycol, 1,2- and 1,3-propanediol, 1,2-, 1,3- and 1,4-butanediol, 2-ethyl-1,3-propanediol, 2-ethyl-1,3-hexanediol, neopentyl glycol, 2,2-trimethyl-1,3-pentanediol, 1,6-hexanediol, 1,2-cyclohexanediol and 1,4-cyclohexanediol, 1,2- and 1,4-bis-(hydroxymethyl)-cyclohexane and adipic acid-bis-(ethyleneglycolester); ether alcohols such as di- and triethyleneglycol and dipropyleneglycol; dimethylolpropionic acid; alkoxylated bisphenols containing two $C_2$–$C_3$ alkoxyl groups per molecule; perhydrogenated bisphenols; 1,2,4-butanetriol; 1,2,6-hexanetriol; trimethylolethane; trimethylolpropane; trimethylolhexane; glycerol; pentaerythritol; dipentaerythritol; mannitol; and sorbitol. The commonest alcohols are glycerol, trimethylolpropane, neopentyl glycol and pentaerythritol. Preferred polyhydric alcohols for the synthesis of the partial esters (i) are based entirely or predominantly (more than about 50 mole-%) of at least trihydric alcohols.

Preferred long-chain unsaturated fatty acids for the synthesis of the partial esters (i) and the polyesters (ii) generally contain from 6 to 24 carbon atoms and comprise the fatty acids of linseed oil, soya oil, wood oil, safflower oil, cottonseed oil, dehydrated castor oil and train oils, fractions of these fatty acids, tall oil fatty acid and also fatty acids obtained from the acids or their esters by conjugation or isomerization.

Preferred polycarboxylic acids for the synthesis of the polyesters (ii) are saturated or unsaturated aliphatic, cycloaliphatic and/or aromatic polybasic carboxylic acids, preferably di-, tri- and tetracarboxylic acids containing 2 to 14, preferably 4 to 12 carbon atoms per molecule and esterifiable derivatives thereof (for example anhydrides or esters). Examples include phthalic acid anhydride, isophthalic acid, terephthalic acid, tetrahydro- and hexahydrophthalic acid anhydride, endomethylenetetrahydrophthalic acid, succinic acid, glutaric acid, sebacic acid, azelaic acid, trimellitic acid and trimellitic acid anhydride and pyromellitic acid anhydride. Phthalic acid anhydride is a preferred acid component.

The oil length of the ester (A) is expressed as triglyceride, based on the weight of ester (A). This means that the oil length expresses the amount of long-chain unsaturated fatty acid calculated as triglyceride i.e. as the corresponding oil.

The partial esters (i) have a molecular weight of about 500 to 2000, preferably about 800 to 1600 while the polyesters (ii) have a molecular weight of about 1000 to 10,000, preferably about 1500 to 8,000, as determined by the gel permeation chromatography (GPC) on styragels with tetrahydrofuran as eluent. After establishment of a universal standard relation (see Z. Grubisic, R. Rempp, H. Bevoit, J. Polym. Sci. Part B, Polymer Letters 5 (1967) 745), the molecular weight averages Mn are determined from the distribution of the chromatograms.

The polyisocyanates (B) and their production are known (cf. U.S. Pat. No. 4,394,495). They may be produced for example from alkyl benzenes by nitration, hydrogenation and phosgenation in that order. Typical polyisocyanates (B) are those in which R represents hexyl, nonyl, decyl, undecyl, dodecyl, tridecyl, tetradecyl or hexadecyl; these radicals may be both linear and branched. About 70 to 90% of the isocyanate groups are in the 2,4-position and about 10 to 30% are in the 2,6-position.

The binders obtainable from components (A) and (B) generally have acid numbers of <1 to 20, hydroxyl numbers of 0 to about 120 and molecular weights determined as number averages of about 2000 to 10,000 (molecular weights up to about 5000 are determined by vapor pressure osmometry in dioxane and acetone; in the event of differing values, the lower value is regarded as correct; molecular weights above 5000 are determined by membrane osmometry in acetone).

The binders according to the invention may be produced from the partial ester (i) and/or the polyester (ii) and the diisocyanate (B) by heating to temperatures of about 60° to 160° C., preferably about 75° C. The reaction may be terminated when the isocyanate content has fallen below about 1% by weight.

Accordingly, the present invention also relates to a process for the production of the binders according to the invention by heating components (A) and (B).

Coating compositions ready for use may be prepared from the binders according to the invention by the incorporation of standard additives such as organic solvents, siccatives, levelling agents, antiskinning agents, foam inhibitors, viscosity regulators, pigments, dyes, hardening catalysts, UV absorbers, stabilizers against thermal and oxidative degradation, etc.

Preferred organic solvents include monohydric alcohols such as methanol, ethanol and isopropanol; carboxylic acid alkyl esters such as acetic acid ethyl and butyl ester; ether alcohols such as ethylene and propylene glycol monoethyl ether; ether esters such as ethylglycol acetate and propylglycol acetate; ketones such as methylethylketone and methylisobutylketone; cyclohexane; aromatic hydrocarbons such as toluene and xylene; and aliphatic hydrocarbons such as various petroleum fractions. The organic solvents are preferably used in quantities of about 20 to 70% by weight, based on the coating composition.

Suitable substrates for the coating compositions produced with the binders according to the invention are metals, wood, plastics and mineral substrates. The coating compositions may be applied by the methods normally used in lacquer technology, for example by spray coating, spread coating, casting, dip coating or roll coating. The coating compositions are generally applied in such quantities that the coatings formed have dry film thicknesses of about 0.005 to 0.10 mm. The coatings are generally dried at room temperature.

The invention is further illustrated, but is not intended to be limited by the following examples in which all parts and percentages are by weight unless otherwise specified.

EXAMPLES

Example 1

3892 g soya oil, 608 g pentaerythritol and 0.92 g dibutyl tin oxide were weighed into a 5-liter stirring vessel equipped with an esterification attachment and a nitrogen inlet pipe, heated to 240° C. in about 3 hours while nitrogen was passed through (6 liters/hour) and transesterified at that temperature until a mixture of 1 part esterification mixture in 15 parts ethanol remained clear on cooling to 20° C. After cooling to 150° C., 694 g were removed. 203 g trimethylolpropane and 558 g phthalic acid anhydride were added to the 3806 g transesterification mixture remaining in the vessel. After heating to 210° C., esterification was continued while nitrogen was passed through (approx. 12 liters/hour) until an acid number of 0.8 and a viscosity corresponding to a flow-out time, 95% in xylene, of 205 seconds had been reached. The reaction mixture was then cooled to 130° C.

1800 g petrol and 683 g 2,4-diisocyanatoalkylbenzene[1] were added to 2238 g of this resin while nitrogen was passed through (approx. 2 liters nitrogen/-hour) and the urethanization reaction continued until an NCO content of 0.08% had been reached. 11.5 g phthalic acid anhydride were added at 80° C., followed by stirring for 4 hours at 80° C. A resin solution was obtained which had a solids content of 60.5%, a viscosity of 807 mPa.s, an acid number of 1.8 and an OH number of 24.

[1] 2,4-diisocyanatoalkylbenzene, chain length of alkyl group $C_{10}$-$C_{13}$, prepared by disproportionation of individual fractions from the ethylene oligomerization reaction and subsequent Friedel-Crafts alkylation of the $C_{10}$-$C_{13}$ α-olefin mixture with benzene.

Example 2

1147 g tall oil fatty acid, 122 g glycerol, 68 g 1,2-propanediol, 205 g pentaerythritol and 262 g phthalic acid anhydride were weighed into a 4-liter three-necked flash (nitrogen inlet pipe, esterification attachment, column) and heated to 220° C. in 10 hours while nitrogen was passed through (1 liter/hour), the head temperature being limited to a maximum of 105° C. When the head temperature fell below 95° C., the column was removed, the stream of nitrogen increased to 9 liters/hour and the esterification reaction continued until 103 g water had distilled off. The resin obtained had an acid number of 0.9 and a viscosity corresponding to a flow-out time of 84 seconds, 85% in xylene (DIN 53 211).

840 g of the resin thus prepared were dissolved in 1150 g petrol and 310 g of the 2,4-diisocyanatoalkylbenzene from Example 1 were added to the resulting solution. The isocyanate reaction was carried out in stages at 25° C., 70° C. and 120° C. over a period of 20 hours while nitrogen was passed through (1 liter/hour) until an NCO content of 0.12% and a viscosity corresponding to a flow-out time of 47 seconds, 45% in petrol (DIN 53 211), had been reached. The 50.5% resin solution obtained had an acid number of 0.6, a viscosity of 1477 mPa.s and a density of 0.897 g/cm$^3$.

Example 3

The procedure was as in Example 2. The transesterification stage was carried out in a 15-liter stirring vessel at 250° C. using 6779.4 g soya oil, 2268 g trimethylolpropane and 740.8 g pentaerythritol. A resin having an acid number of 8.3 and a viscosity corresponding to a flow-out time of 61 seconds, 40% in petrol, was prepared by esterification with 4294 g phthalic acid anhydride at 225° C. with elimination of 522 g water. 6780 g of this resin were dissolved in 6246 g petrol and reacted with 656 g of the 2,4-diisocyanatoalkylbenzene[(1)] from Example 1 at 80° C. while nitrogen was passed through (approx. 2 liters/hour) until an NCO content of 0.6% had been reached. A 54.5% resin solution having a viscosity of 18780 mPa.s and an acid number of 6.9 was obtained.

[(1)] 2,4-diisocyanatoalkylbenzene, chain length of alkyl group $C_{10}$-$C_{13}$, prepared by disporpotionation of individual fractions from the ethylene oligomerization reaction and subsequent Friedel-Crafts alkylation of the $C_{10}$-$C_{13}$ α-olefin mixture with benzene (1) 2,4-diisocyanatoalkylbenzene, chain length of alkyl group $C_{10}$-$C_{13}$, prepared by disproportionation of individual fractions from the ethylene oligomerization reaction and subsequent Friedel-Crafts alkylation of the $C_{10}$-$C_{13}$ α-olefin mixture with benzene Comparison Example 1

A binder was prepared in the same way as described in Example 1 using 462 g isophorone diisocyanate to 2238 g resin and 1800 g petrol. A binder having a solids content of 60.2%, a viscosity of 4576 mPa.s, an acid number of 2.1 and an OH number of 2.6 was obtained.

Comparison Example 2

A binder was prepared in the same way as in Example 2. A resin solution having an NCO content of 0.7%, a viscosity of 451 mPa.s, an acid number of 0.4 and a solids content of 51.5% was obtained from 1550 g of the resin, 1853 g petrol and 303 g 2,4-tolylene diisocyanate.

Production of a Clear Lacquer

Clear lacquers were prepared from the binders of Examples 1 and 2 and Comparison Examples 1 and 2 using the formulations indicated below. After drying in air, these clear lacquers gave coatings having the values indicated (layer thickness of the coatings on application 120 μm).

1 part of a polyetherpolysiloxane-based levelling agent, 2.5 parts calcium octoate, 0.66 part cobalt octoate (6% Co), 1.66 parts lead octoate (24% Pb) and 2.50 parts of methyl-ethyl-ketoxime (antiskinning agent) were added to each lacquer before application. The lacquer solutions were adjusted to a viscosity corresponding to a flow-out time of 120 secs. (DIN 53 211) by addition of petrol in the quantities indicated.

|  | Example | | Comparison Example | |
|---|---|---|---|---|
|  | 1 | 2 | 1 | 2 |
| Resin Solution (parts) | 166.8 | 196 | 166.2 | 196 |
| White spirit (parts) | 24.2 | 35 | 41.7 | 42.3 |
| Solids content (%) | 58.2 | 45.4 | 50.1 | 41.9 |
| Water resistance (h) | 24 | >24 | 4 | <4 |

Production of a White Lacquer

The binders of Examples 1 and 3 and Comparison Example 1 were compared with one another in the following. The white lacquer was prepared in such a way that the final coating composition had a viscosity corresponding to a flow-out time of 150 s.

The white lacquer was cast onto glass plates in a wet film layer thickness of 120 μm and the dried films were measured for body and brilliance after drying in air for 24 hours.

|  | Example 1 | Example 3 | Comparison Example 1 |
|---|---|---|---|
| Binder | 166.7 | 183.5 | 166.1 |
| Calcium octoate (4% Ca content) | 3.75 | 3.75 | 3.75 |
| Montmorillonite | 1.50 | 1.50 | 1.50 |
| Titanium dioxide | 70.00 | 70.00 | 70.00 |
| Cobalt octoate (6% Co) | 0.66 | 0.66 | 0.66 |
| Lead octoate (25% Pb) | 2.50 | 2.50 | 2.50 |
| Methylethylketoxime, 55% in white spirit | 1.50 | 1.50 | 1.50 |
| Matting agent (highly disperse silica) | 10.00 | 10.00 | 10.00 |
| Petrol | 26.30 | 9.60 | 28.50 |
| Brilliance of coatings after storage at room temperature | | | |
| Streak-free | >8 weeks | >8 weeks | <2 weeks |
| Body | good | good | poor |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an oxidatively drying binder containing ester groups and urethane groups which comprises reacting in the presence of heat
   (A) about 60 to 98% by weight of an ester having an oil length of about 20 to about 75% by weight and a OH number of about 20 to 150 which comprises a member selected from the group consisting of
      (i) esters of polyhydric alcohols and long chain unsaturated fatty acids,
      (ii) polyesters of polyhydric alcohols, long chain unsaturated fatty acids and polycarboxylic acids and
      (iii) mixtures of (i) and (ii) with
   (B) about 2 to 40% by weight of a polyisocyanate having the structure

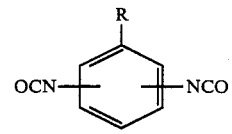

wherein R is a $C_6$-$C_{18}$ alkyl radical.

2. The oxidatively drying binder prepared in accordance with claim 1.

3. A process for the production of coated substrates which comprises coating a substrate with the binder of claim 2 and exposing said substrate to oxygen.

4. A coated substrate prepared by a process which comprises coating a substrate with the binder of claim 2 and exposing said substrate to oxygen.

* * * * *